(12) United States Patent
Khan et al.

(10) Patent No.: US 8,953,070 B2
(45) Date of Patent: Feb. 10, 2015

(54) APPARATUS, METHODS AND SYSTEMS FOR RANDOMLY ACCESSING PIXEL DATA FROM STREAMING IMAGE SENSOR DATA

(75) Inventors: Tareq Hasan Khan, Saskatoon (CA); Khan Arif Wahid, Saskatoon (CA)

(73) Assignee: University of Saskatchewan, Saskatoon, SK (CA)

( * ) Notice: Subject to any disclaimer, the term of this patent is extended or adjusted under 35 U.S.C. 154(b) by 362 days.

(21) Appl. No.: 13/328,503

(22) Filed: Dec. 16, 2011

(65) Prior Publication Data

US 2013/0155279 A1 Jun. 20, 2013

(51) Int. Cl.
*H04N 3/14* (2006.01)

(52) U.S. Cl.
USPC .......................................................... 348/294

(58) Field of Classification Search
CPC ................................. H04N 5/378; H04N 1/32
USPC .......................................................... 348/294
See application file for complete search history.

(56) References Cited

U.S. PATENT DOCUMENTS

| 2007/0024713 | A1 | 2/2007 | Baer et al. | |
| 2010/0302426 | A1* | 12/2010 | Moini et al. | 348/308 |
| 2013/0193335 | A1* | 8/2013 | Saito | 250/370.09 |

OTHER PUBLICATIONS

Khan et al., "A DVP-Based Bridge Architecture to Randomly Access Pixels of High-Speed Image Senors", EURASIP Journal on Embedded Systems, Hindawi Publishing Corporation, vol. 2011, Article ID 270908, Feb. 2011.
Khan et al., "Universal bridge interface for DVP-compatible image sensors", Microprocessors and Microsystems 35 (2011), pp. 547-556, Jun. 2011.
Khan et al., "Design of a Bridge to Randomly Access High Speed image Sensor Pixels in Embedded Systems", Proc. 6th International Conference on Electrical and Computer Engineering, pp. 450-453, Dec. 2010.
Khan et al., "Towards Design of a Bridge to Enable High Speed Image Sensors for Random Access", Proc. IEEE International Conference on Microelectronics (ICM), pp. 431-434, Dec. 2010.
Khan et al., "Design of a DVP Compatible Bridge to Randomly Access Pixels of High Speed Image Sensors", Proc. IEEE International Conference on Consumer Electronics (ICCE), pp. 911-912, Jan. 2011.
A. Elouardi, S. Bouaziz, A. Dupret, L. Lacassagne, J. O. Klein, and R. Reynaud, "A smart sensor for image processing: towards a system on chip," in Proceedings of International Symposium on Industrial Electronics (ISIE '06), vol. 4, pp. 2857-2862, Jul. 2006.

(Continued)

*Primary Examiner* — James Hannett
(74) *Attorney, Agent, or Firm* — Duane Morris LLP

(57) ABSTRACT

Apparatus, methods and systems for bridging between commercially available, high-speed image sensors and low cost, low power microcontrollers. An image sensor interface processor is provided for controlling an image sensor, and receiving and storing image data. A microcontroller (or other general purpose or image processor) can communicate with the image sensor interface processor, to access pixel data in a random access fashion through a parallel memory access interface at any speed desired by the microcontroller. Moreover, automatic power management of the image sensor can be provided by the image sensor interface processor. In some alternative embodiments, the described image sensor interface processor may be integrated into the image sensor itself, or a microcontroller, or some other intermediate device.

19 Claims, 12 Drawing Sheets

(56) References Cited

OTHER PUBLICATIONS

A. Holberg and A. Saetre, "Innovative techniques for extremely low power consumption with 8-bit microcontrollers," AtmelWhite Paper, 2006.

A. Moglia, A. Menciassi, P. Dario, Recent patents on wireless capsule endoscopy, Recent Patents on Biomedical Engineering 1 (1) (2008) 24-33.

A. Teman, S. Fisher, L. Sudakov, A. Fish, and O. Yadid-Pecht, "Autonomous CMOS image sensor for real time target detection and tracking," in Proceedings of the IEEE International Symposium on Circuits and Systems (ISCAS '08), pp. 2138-2141, May 2008.

B. Dierickx, D. Scheffer, G. Meynants, W. Ogiers, and J. Vlummens, "Random addressable active pixel image sensors," in Advanced Focal Plane Arrays and Electronic Cameras, vol. 2950 of Proceedings of SPIE, pp. 2-7, Berlin, Germany, Oct. 1996.

D. Scheffer, B. Dierickx, and G. Meynants, "Random addressable 2048×2048 active pixel image sensor," IEEE Transactions on Electron Devices, vol. 44, No. 10, pp. 1716-1720, 1997.

Y. Oike, M. Ikeda, and K. Asada, "A CMOS image sensor for high-speed active range finding using column-parallel time domain ADC and position encoder," IEEE Transactions on Electron Devices, vol. 50, No. 1, pp. 152-158, 2003.

F.C. Kao, C.Y. Huang, Z.H. Ji, and C. W. Liu, "The design of intelligent image sensor applied to mobile surveillance system," in Proceedings of IEEE Intelligent Vehicles Symposium (IV '07), pp. 264-269, Jun. 2007.

G. Chapinal, S. A. Bota, M. Moreno, J. Palacin, and A. Herms, "A 128×128 CMOS image sensor with analog memory for synchronous image capture," IEEE Sensors Journal, vol. 2, No. 2, pp. 120-127, 2002.

H. Ji and P. A. Abshire, "A CMOS image sensor for low light applications," in Proceedings of IEEE International Symposium on Circuits and Systems (ISCAS '06), pp. 1651-1654, May 2006.

H.J. Gelke, Implementation of a Wimedia UWB Media Access Controller, in: Proceedings of the Embedded World Conference, 2009.

H.J. Park, K.B. Kim, J.H. Kim, and S. Kim, "A novel motion detection pointing device Using a binary CMOS image sensor," in Proceedings of IEEE International Symposium on Circuits and Systems (ISCAS '07), pp. 837-840, May 2007.

I. Takayanagi, M. Shirakawa, K. Mitani et al., "A 1.25-inch 60-frames/s 8.3-m-pixel digital-output CMOS image sensor," IEEE Journal of Solid-State Circuits, vol. 40, No. 11, pp. 2305-2313, 2005.

J. H. Kim, S. G. So, and K. S. Joo, "Development and performances of a dental digital radiographic system using a high resolution CCD image sensor," in Proceedings of IEEE Nuclear Science Symposium Conference Record, vol. 3, pp. 1649-1653, Oct. 2004.

J. Honghao, P.A. Abshire, A CMOS image sensor for low light applications, in: Proceedings of the IEEE International Symposium on Circuits and Systems, 2006, pp. 1651-1654.

J. Uthus and O. Strom, "MCU architectures for computeintensive embedded applications," AtmelWhite Paper, 2005.

K. Takita and S. Hirose, "Development of image sensor unit for rescue devices," in Proceedings of the IEEE International Conference on Robotics and Biomimetics (ROBIO '05), pp. 687-692, Jul. 2005.

K. Umeda, "A compact range image sensor suitable for robots," in Proceedings of IEEE International Conference on Robotics and Automation, vol. 3, pp. 3167-3172, May 2004.

K. Wahid, S. Ko, D.Teng, Efficient hardware implementation of an image compressor for wireless capsule endoscopy applications, in: Proceedings of the International Joint Conference on Neural Networks, 2008, pp. 2761-2765.

K. Yoon, C. Kim, B. Lee, and D. Lee, "Single-chip CMOS image sensor for mobile applications," IEEE Journal of Solid-State Circuits, vol. 37, No. 12, pp. 1839-1845, 2002.

L. Fanucci, S. Saponara, and A. Morello, "Power optimization of an 8051-compliant IP microcontroller," IEICE Transactions on Electronics, vol. E88-C, No. 4, pp. 597-600, 2005.

M. Zhang, A. Bermak, X. Li, and Z. Wang, "A low power CMOS image sensor design for wireless endoscopy capsule," in Proceedings of IEEE-BIOCAS Biomedical Circuits and Systems Conference (BIOCAS '08), pp. 397-400, Nov. 2008.

O. Yadid-Pecht, R. Ginosar, and Y. Shacham-Diamand, "A random access photodiode array for intelligent image capture," IEEE Transaction on Electron Devices, vol. 38, No. 8, pp. 1772-1780, 1991.

P. Turcza, M. Duplaga, Low-power image compression for wireless capsule endoscopy, in: Proceedings of the IEEE International Workshop on Imaging Systems and Techniques, 2007, pp. 1-4.

R. Oi, T. Hamamoto, and K. Aizawa, "Pixel based random access image sensor array for real-time IBR," in Proceedings of the 1st IEEE International Conference on Sensors (Sensors '02), vol. 1, pp. 134-139, Jun. 2002.

R. Wagner, UART Crystal Oscillator Design Guide, Data Communications Application Note, (Mar. 2000), <http://www.exar.com>.

Y. Nishikawa, S. Kawahito, M. Furuta, and T. Tamura, "A highspeed CMOS image sensor with on-chip parallel image compression circuits," in Proceedings of IEEE Custom Integrated Circuits Conference (CICC '07), pp. 833-836, Sep. 2007.

S. Decker, R. D. McGrath, K. Brehmer, and C. G. Sodini, "A 256×256 CMOS imaging array with wide dynamic range pixels and column-parallel digital output," IEEE Journal of Solid-State Circuits, vol. 33, No. 12, pp. 2081-2090, 1998.

S. Saponara, L. Fanucci, and P. Terreni, "Architectural-level power optimization of microcontroller cores in embedded systems," IEEE Transactions on Industrial Electronics, vol. 54, No. 1, pp. 680-683, 2007.

S. Zhan, T. Kurihara, and S. Ando, "Facial authentication system based on real-time 3D facial imaging by using correlation image sensor," in Proceedings of the 6th International Conference on Intelligent Systems Design and Applications (ISDA '06), vol. 2, pp. 396-400, Oct. 2006.

T. Lenart and V. Owall, "Xstream—a hardware accelerator for digital holographic imaging," in Proceedings of the 12th IEEE International Conference on Electronics, Circuits and Systems (ICECS '05), Gammarth, Tunisia, Dec. 2005.

Z. Lin, M.W. Hoffman, W. D. Leon, N. Schemm, and S. Balkir, "A CMOS front-end for a lossy image compression sensor," in Proceedings of the 7th IEEE International Symposium on Circuits and Systems (ISCAS '07), pp. 2838-2841, May 2007.

Y. Cao, F. Tang, A. Bermak, and T. M. Le, "A smart CMOS image sensor with on-chip hot pixel correcting readout circuit for biomedical applications," in Proceedings of the 5th IEEE International Symposium on Electronic Design, Test and Applications (DELTA '10), pp. 103-107, Jan. 2010.

\* cited by examiner

APPARATUS, METHODS AND SYSTEMS FOR RANDOMLY ACCESSING PIXEL DATA FROM STREAMING IMAGE SENSOR DATA

FIELD

The described embodiments relate to image processing and, in particular, to real-time processing of data from an image sensor.

BACKGROUND

An image sensor is an electronic device that can be used to capture an optical image. Image sensors are commonly found in digital cameras and other imaging devices. Modern image sensors can be broadly grouped into two broad classifications based on the type of detection unit used: charge-coupled devices (CCD) or complementary metal-oxide semiconductor (CMOS) active pixel sensors. However, other types of image sensors are also known to exist.

Generally, image sensors comprise photo sensors capable of capturing light (e.g., photons) impinging on a detection element and converting the photons into electrical signals. Subsequently, additional circuitry may convert the electrical signals into image data.

SUMMARY

In a first broad aspect, there is provided an interface processor for providing random access to an image frame from an image sensor. The interface processor may comprise: a memory; a sensor control module configured to transmit a wake signal to the image sensor; a pixel stream module configured to receive a data signal at an output data rate from the image sensor following transmission of the wake signal and store the data signal in the memory, wherein the data signal comprises a plurality of pixels that correspond to the image frame; and a frame access module configured to receive an address signal, determine a selected pixel of the plurality of pixels referenced by the address signal, retrieve the selected pixel from the memory, and transmit an image signal comprising the selected pixel.

The data signal may be received from the image sensor in real-time. The data signal may be received using a digital video port (DVP) interface.

The sensor control module may be further configured to transmit a configuration command to the image sensor. The configuration command may comprise a frame size or color depth. The configuration command may be a sleep command, and the sleep command may be transmitted following receipt of the plurality of pixels that correspond to the image frame. The configuration command may be transmitted using the I2C protocol.

The sensor control module may be further configured to store a configuration mapping associated with the image sensor, wherein the configuration mapping comprises one or more register addresses and one or more register entries for controlling the image sensor. The sensor control module may be further configured to receive the configuration mapping prior to transmitting the wake signal.

The plurality of pixels may be transmitted serially in the data signal. In some cases, the plurality of pixels may be transmitted serially on a row-by-row basis in the data signal.

In some cases, the selected pixel is individually addressable in the plurality of pixels. The selected pixel may be determined based on a row and a column of the image frame provided in the address signal.

An address generation module may be configured to generate a read address for the selected pixel based on the row and the column provided in the address signal.

The image signal may be transmitted to a microcontroller. An input data rate of the microcontroller may be lower than the output data rate of the data signal.

In some cases, the frame access module may be further configured to receive a block size signal, determine a block of pixels in the plurality of pixels referenced by the address signal and the block size signal, retrieve the block of pixels from the memory, and transmit the image signal comprising the block of pixels, wherein the block of pixels comprises the selected pixel.

In another broad aspect, there is provided a method for providing random access to an image frame from an image sensor. The method may comprise: transmitting a wake signal to the image sensor from an interface processor; receiving a data signal at an output data rate from the image sensor following transmission of the wake signal; storing the data signal in a memory, wherein the data signal comprises a plurality of pixels that correspond to the image frame; receiving an address signal; determining a selected pixel of the plurality of pixels referenced by the address signal; retrieve the selected pixel from the memory; and transmitting an image signal comprising the selected pixel.

In yet another broad aspect, there is provided an image sensing system. The system may comprise: an image sensor; a processor; and an interface processor for providing random access to an image frame from the image sensor, the interface processor comprising: a memory; a sensor control module configured to transmit a wake signal to the image sensor; a pixel stream module configured to receive a data signal at an output data rate from the image sensor following transmission of the wake signal and store the data signal in the memory, wherein the data signal comprises a plurality of pixels that correspond to the image frame; and a frame access module configured to receive an address signal, determine a selected pixel of the plurality of pixels referenced by the address signal, retrieve the selected pixel from the memory, and transmit an image signal comprising the selected pixel.

BRIEF DESCRIPTION OF THE DRAWINGS

A preferred embodiment of the present invention will now be described in detail with reference to the drawings, in which.

DESCRIPTION OF EXEMPLARY EMBODIMENTS

Figure 1:
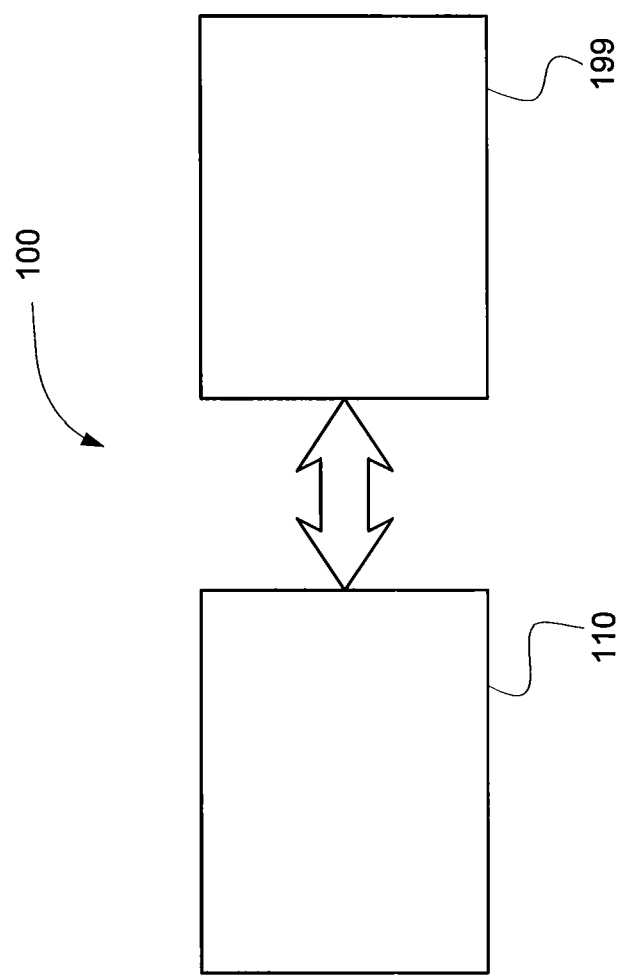
FIG. 1 illustrates a prior art image sensing system.

Image sensors have increased in quality and capability in recent years. At the same time, image sensors have also decreased in price, making them suitable and desirable for use in small, low power electronic devices and systems, such as medical implants and the like. However, image sensors can be difficult to interface with many commercially available microcontrollers and processors commonly used in such electronic devices, because the image sensors can produce data at such a high rate that it cannot be processed in real time by the microcontrollers.

In particular, existing image sensor and microcontroller designs suffer from a number of drawbacks.

First, high-speed image sensors generally produce image data at such a high rate that it cannot be processed in real time by the relatively slower microcontrollers without additional image processing hardware. As a consequence, many high-speed image sensors are difficult to use in low-power and low-speed embedded systems. For example, a Toshiba TCM8230MD image sensor produces image data at a rate of 6 to 12 MHz. Conversely, a common microcontroller, such as the Atmel ATmega644 operates at a maximum clock rate of 8 MHz (without an external crystal). Accordingly, real time processing of image data can be difficult.

Second, image sensors typically stream image data in real time, and do not provide internal buffer memory. Conversely, microcontrollers typically have limited internal memory and thus may not be capable of storing a complete image frame unless external memory is used (which may be inefficient and increase design complexity and cost). For example, the Atmel ATmega644 has 4 kB of internal memory. However, to store a relatively modest-sized grayscale QVGA image frame (i.e., 320×240 pixels×1 byte/pixel) requires 76.8 kB of memory to buffer the entire image in memory.

Further, many image processing algorithms, such as transform coding using the Discrete Cosine Transform (DCT) access pixel data in a random access fashion. Many image processing and medical imaging applications may use such transform coding, e.g., for image compression. These transform-based algorithms generally process image data as 4×4 or 8×8 pixel blocks. However, commercial CMOS image sensors typically send image data in a row-by-row (raster scan) fashion. That is, the first row is read prior to the second row, and so on. Lacking sufficient buffer memory, the image data cannot be accessed randomly to facilitate such transform-based algorithms.

An example of a pixel sequence produced in a raster scan output of a typical image sensor is shown in Table 1A. It can be observed that each row is read sequentially from left to right before the next row is read. Conversely, an example of a pixel sequence used by a 4×4 block-level algorithm is shown in Table 1B. It can be observed that four pixels are read from left to right before moving to the subsequent row. The process repeats until all 16 pixels in the block have been read (four rows with four pixels per row) and then repeats the process beginning from the first row, but offset to begin in the fifth column (pixel 17 in Table 1B).

TABLE 1A

| 1  | 2  | 3  | 4  | 5  | 6  | 7  | 8  | 9  | 10 | 11 | 12 |
|----|----|----|----|----|----|----|----|----|----|----|----|
| 13 | 14 | 15 | 16 | 17 | 18 | 19 | 20 | 21 | 22 | 23 | 24 |

TABLE 1A-continued

| 25 | 26 | 27 | 28 | 29 | 30 | 31 | 32 | 33 | 34 | 35 | 36 |
|----|----|----|----|----|----|----|----|----|----|----|----|
| 37 | 38 | 39 | 40 | 41 | 42 | 43 | 44 | 45 | 46 | 47 | 48 |

TABLE 1B

| 1  | 2  | 3  | 4  | 17 | 18 | 19 | 20 | 33 | 34 | 35 | 36 |
|----|----|----|----|----|----|----|----|----|----|----|----|
| 5  | 6  | 7  | 8  | 21 | 22 | 23 | 24 | 37 | 38 | 39 | 40 |
| 9  | 10 | 11 | 12 | 25 | 26 | 27 | 28 | 41 | 42 | 43 | 44 |
| 13 | 14 | 15 | 16 | 29 | 30 | 31 | 32 | 45 | 46 | 47 | 48 |

In some commercial image sensors, such as the Aptina MT9V011, partial access of image frame segments is possible, using a process called windowing. In the windowing process, two corners of a rectangular area can be specified by configuring specific control registers of the image sensor. Subsequently, the image sensor captures and transmits only image data corresponding to the pre-specified rectangular window.

However, it is not possible to subsequently access other segments of the same frame with this feature, as would be typical in several image coding applications such as transform coding. Moreover, the internal control registers of the image sensor must be reconfigured every time an image capture request is sent, resulting in extra processing overhead. Correspondingly, because of the time required for reconfiguration and due to the absence of buffer memory to store the captured frame inside the sensor, the sensor cannot capture two different regions of the same frame. In these image sensors, windowing is limited to rectangular shapes only.

Commercial image sensors generally implement the Inter-Integrated Circuit (I2C or $I^2C$) two-wire interface, which is a low speed serial bus, for configuration and control purposes. Among other things, the I2C is typically used to initialize image sensors, which may necessitate additional logic and overhead in the microcontroller to support the image sensor.

A high speed clock must be provided to the image sensors. For example, one type of image sensor may require a clock signal in the range of 12-25 MHz for it to operate normally. Accordingly, the embedded system should have a clock generator to support the image sensor.

Finally, many image sensors support a high frame output rate, ranging from 15 to 500 frames per second (FPS). Such high frame rates may lead to higher power consumption in the image sensor. However, for low power applications (e.g., wireless capsule endoscopy), a lower frame rate (e.g., 2 to 4 FPS) may be sufficient. In many cases, a reduction of power consumption and frame rate may be desirable.

The described embodiments provide image sensor interface processors (ISIP) for interfacing between an image sensor and a microcontroller. In particular, the described embodiments are suitable for interfacing a low speed, low power, low complexity microcontroller to a high speed image sensor.

The described embodiments can provide an abstracted interface for the microcontroller, removing the need to implement I2C or other interfaces specific to any one image sensor. Rather, the image sensor interface processor can be configured to handle image sensor initialization and other configuration tasks. Accordingly, the microcontroller can be freed to focus on processing image data.

Similarly, once an image frame is captured and stored in the image sensor interface processor's internal memory, the pixel data can then be accessed by the image processor in a random fashion through a parallel memory access interface. Such random access can be performed at any speed suitable for the microcontroller.

To reduce the power consumption, the image sensor interface processor can be configured to automatically send a sleep mode command to the image sensor after an image frame is captured, and before the image data is actually processed. A clock generator may also be included in the interface processor to provide a clock signal for the image sensor.

Using the described embodiments, the need for a higher speed, higher power (and more complex) microcontroller, microprocessor or other image processor can be diminished or eliminated. For example, microcontrollers such as the Atmel AT91CAP7E provide many additional features (e.g., six-layer advanced high-speed bus, peripheral Direct Memory Access controller, Universal Serial Bus 2.0 full-speed interface, and configurable FPGA interface) that may not be required for a low power, embedded application. However, programming such advanced microcontrollers and implementing the required protocols requires additional effort, increases cost and complexity of the overall design and may increase power requirements. In contrast, the described embodiments provide a compact, ready-made interface processor for interfacing various commercial image sensors with low-cost, easy-to-program, and popular microcontrollers (such as the Atmel 8051, Atmel 8-bit AVR and Microchip Technology PIC family).

The described embodiments are suitable for use in various embedded system applications where random access of image pixels is required, such as pattern recognition, robotic vision, biomedical imaging, and industrial tracking systems.

Referring now to FIG. 1, there is shown a prior art image sensing system. Image sensing system 100 comprises an image sensor 110 and a high performance microcontroller 199.

Image sensor 110 may be a high speed CMOS or CCD image sensor, such as the Toshiba TCM8230MD, capable of capturing and transmitting image frames of one or more resolutions, such as CIF (352×288), QVGA (320×240), VGA (640×480), full HD (1920×1080), and UHDV (7680×4320), or the like. In general, image sensor 110 does not comprise a memory buffer for providing random access to complete image frames. Rather, image sensor 110 outputs raw pixel data on a row-by-row basis.

Microcontroller 199 is a high-performance, high-complexity microcontroller, such as the Atmel AT91CAP7E. In some cases, microcontroller 199 may be a general purpose microprocessor or dedicated image processing ASIC. In general, microcontroller 199 has a clock speed in excess of 55 MHz and more commonly in excess of 80 MHz, however other speeds are possible. In general, microcontroller 199 has a processing bandwidth higher than the data throughput rate of the data signal produced by image sensor 110. Accordingly, microcontroller 199 may be capable of real-time processing (e.g., applying transform coding, etc.) complete frames of image data received directly from image sensor 110.

In many cases, the complexity of a high-performance microcontroller 199 results in a large number of input-output pins, which may prevent the use of a dual in-line package (DIP) for the microcontroller. Similarly, microcontroller 199 may utilize relatively complex firmware, requiring effort to configure control registers, resulting in longer development times.

Microcontroller 199 generally includes a number of advanced resources, such as a six-layer advanced high-speed bus (AHB), a peripheral direct memory access (DMA) controller, a Universal Serial Bus (USB) 2.0 full-speed interface, real-time timer (RTT) and the like. These resources may not be necessary for image sensing applications.

Power consumption may be high relative to a simple microcontroller, due to the clock speed of the microcontroller 199. Conversely, power management may be difficult, or more complicated relative to a simple microcontroller.

Despite its speed and on-board cache memory, microcontroller 199 may nevertheless be limited in the size and type of images that it can process in real time. For example, if microcontroller 199 operates at 55 MHz, it may be capable of processing SubQCIF (128×96) and QQVGA (160×120) images in real time, but not QVGA (320×240) images.

Microcontroller 199 is directly connected to image sensor 110 via I2C and other data communication interfaces. Microcontroller 199 is configured to control the operation of image sensor, including the issuance of wake, initialize, reset, sleep, capture image and other commands. Similarly, microcontroller 199 is configured to directly receive and process image data from image sensor 110 in real-time, as such image data is sensed and output by image sensor 110. Accordingly, microcontroller 199 either processes the image data in real-time, or has sufficient buffer memory to contain an entire image frame.

Figure 2:
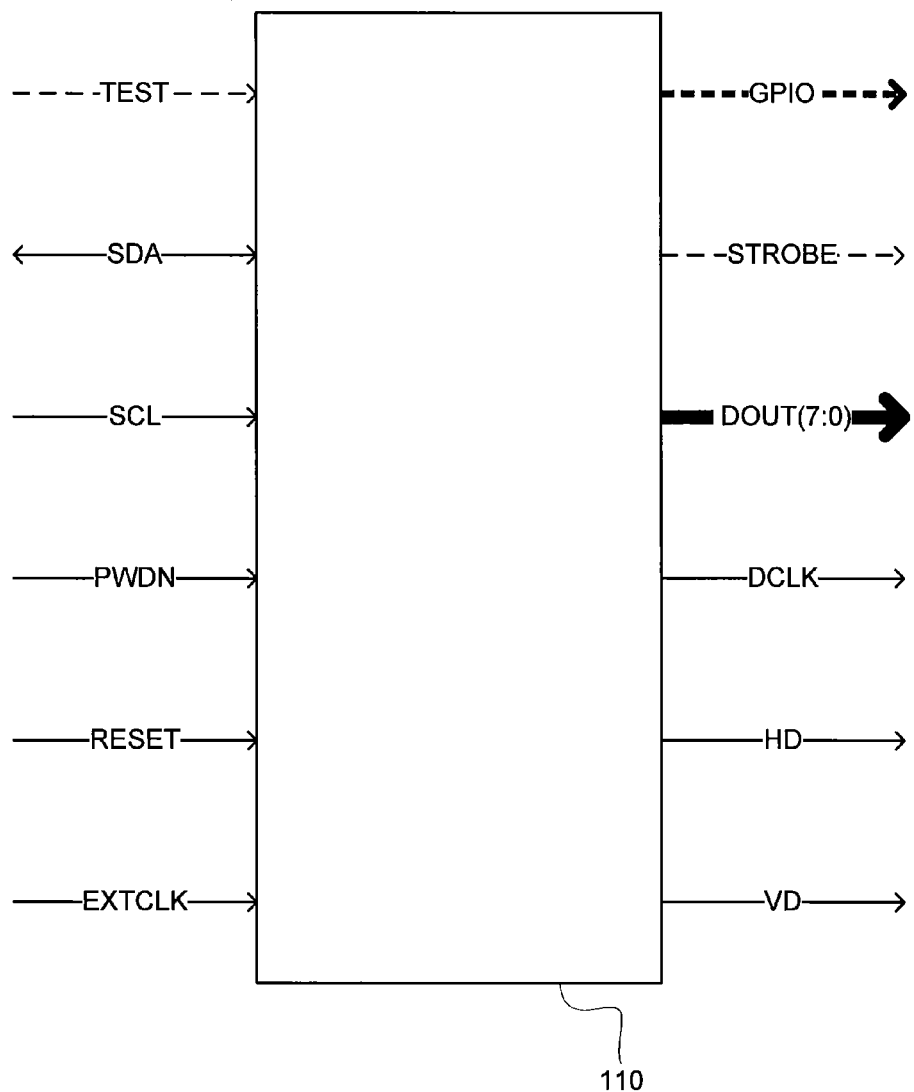
FIG. 2 illustrates an exemplary image sensor.

Referring now to FIG. 2, there is shown an exemplary image sensor, such as image sensor 110 of FIG. 1.

Image sensor 110 can send image data using the Digital Video Port (DVP) protocol and interface. In the DVP protocol, the VD (or VSYNC) and HD (or HSYNC) pins can be used to indicate the 'end of frame' and 'end of row' respectively. Pixel data bytes can be placed on an output bus (e.g., DOUT) at the positive edge of an output data rate signal (e.g., DCLK), which may be some multiple or fraction (e.g., one half or one quarter) of the frequency of an external clock signal (e.g., EXTCLK) used by the image sensor.

Initialization and configuration of the image sensor can be performed using the 2-wire (SCL and SDA) I2C protocol. In some cases, the configuration protocol is referred to as the Serial Camera Control Bus (SCCB) interface. Using this interface, the frame size, color depth, sleep mode, and wake mode can be controlled by sending I2C commands to the image sensor.

An active low reset signal can be applied to the RESET pin, to reset image sensor 110 to an initial state. In some cases, image sensor 110 may have a power management pin (PWDN) used to control a wake or sleep mode of image sensor 110.

Some image sensors may contain additional control pins GPIO, TEST or STROBE which can be used in special modes. However, these extra pins may be tied to a source voltage or ground, or left unconnected in normal operation.

If present, the TEST pin can be used to switch image sensor 110 into a testing mode. The GPIO pin can be general purpose input/output pins, which can be enabled for read and write by reading or writing to specified control registers of image sensor 110. The STROBE pin may be a programmable output pin usable to control or trigger an external LED or other light indicator (e.g., to signal operation of image sensor 110, activate a flash, etc.).

The DVP interface is widely used in most commercially available standard definition (SD) CMOS image sensors, such as the Toshiba TCM8230MD, OmniVision OVM7690, Aptina MT9V011, National LM9618, Kodak KAC-9630 and Pixelplus PO6030K.

Many high definition (HD) CMOS image sensors, such as the OmniVision OV10131 or Aptina MT9P401, also use a DVP interface, or a modified DVP interface with some additional pins.

Although the embodiments referred to herein are described as having a DVP-type interface, it will be appreciated that various other interfaces may also be used with suitable modifications to the described image sensor interface processor. For example, various HD CMOS image sensors, such as the OmniVision OV9810, use a Mobile Industry Processor Interface (MIPI) in lieu of, or in addition to, the DVP interface.

In FIG. 2, the DOUT bus is 8 bits wide, corresponding to 8-bit image data. However, in other embodiments, the data output bus DOUT may be wider or narrower than 8 bits and various sizes of the DOUT bus and encoding schemes may be used, as will be known. For example, the DOUT bus may be ten bits wide, corresponding to 10-bit image data. Likewise, for color image data, the color components of a pixel can be sent one after another on the DOUT bus using 8- or 10-bits per color component for each pixel.

Figure 3:
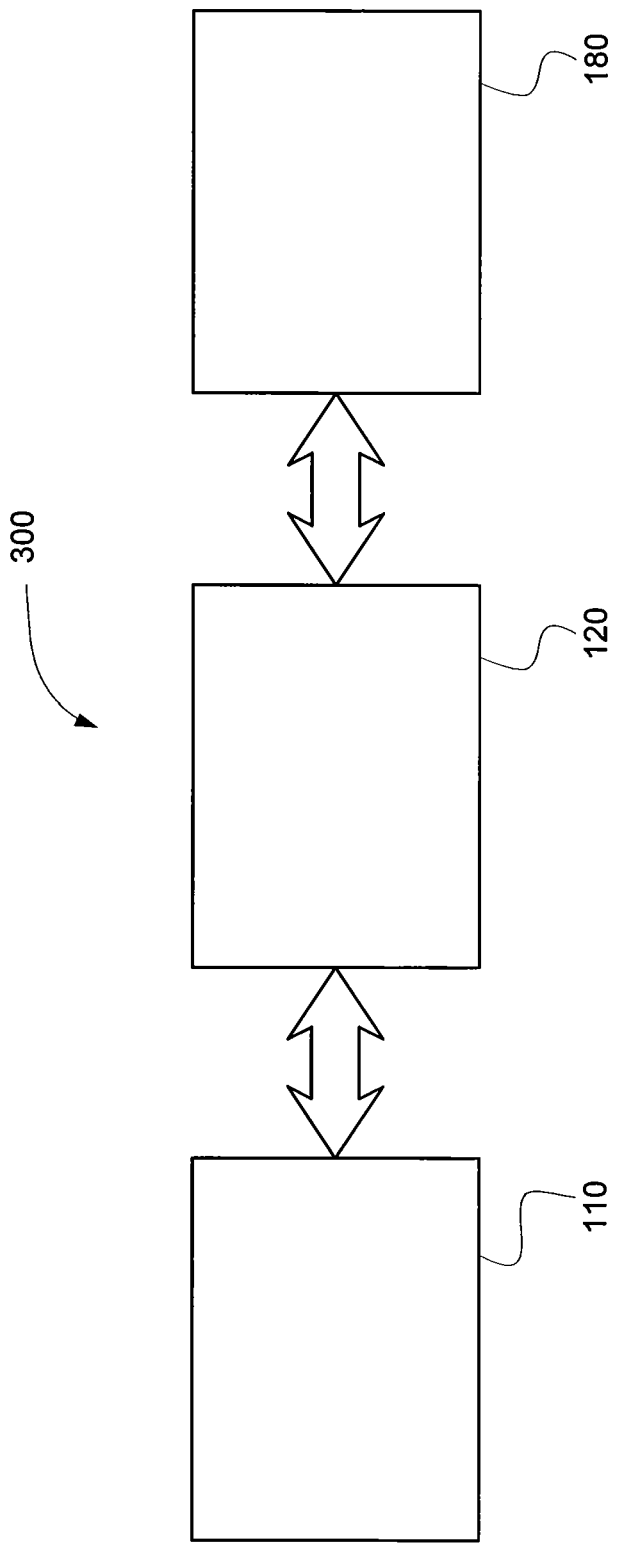
FIG. 3 illustrates an exemplary image sensing system.

Referring now to FIG. 3, there is shown an exemplary image sensing system. Image sensing system comprises an image sensor 110, an image sensor interface processor 120 and a microcontroller 180.

In contrast to microcontroller 199 of FIG. 1, microcontroller 180 is a low-performance or low-power microcontroller, such as the Atmel 8051, Atmel 8-bit AVR and Microchip Technology PIC family. In general, for a given application (e.g., transform coding), microcontroller 180 has a processing bandwidth that is lower than the output bit rate of the data signal produced by image sensor 110. Considered another way, microcontroller 180 has a processing rate that is lower than an output frame rate of image sensor 110, which may be fixed or pre-configured at a higher rate. The processing rate of microcontroller 180 is related to the algorithm, the clock speed of microcontroller 180 and the number of instructions per clock cycle that can be performed by microcontroller 180. The output bit rate of the data signal is related to the data clock (e.g., DCLK, which may be related to EXTCLK) signal and the image size and bit depth. Accordingly, microcontroller 180 is not capable of real-time processing (e.g., applying transform coding, etc.) complete frames of image data received directly from image sensor 110.

For example, if image sensor 110 is configured to capture VGA grayscale images (640×480 pixels, with 8 bits per pixel color data) at 30 frames per second, image sensor 110 may produce a data signal with an output bit rate of approximately 74 Mbps. Accordingly, if microcontroller 180 has a clock frequency of 10 MHz, it may be overwhelmed when attempting to receive the data signal from image sensor 110 and thus not be able to receive and process complete frames of image data.

However, in some applications, complete frames may not be required for processing. Rather, only a small portion of the frame (i.e., region or regions of interest) may be required to be processed. Accordingly, if microcontroller 180 can be provided access to the relevant pixel data, then it may be capable of performing the desired image processing at the full frame rate of image sensor 110.

Conversely, if image sensor 110 can be controlled to produce image frames on an as-needed basis, then microcontroller 180 can perform the desired full frame processing at a reduced frame rate. That is, even if image sensor 110 only provides an output frame rate of, for example, 15 or 30 fps, if only particular frames of interest are captured and stored in a memory by an intermediate device, then microcontroller 180 can subsequently perform the required processing at its reduced processing rate.

Figure 4:
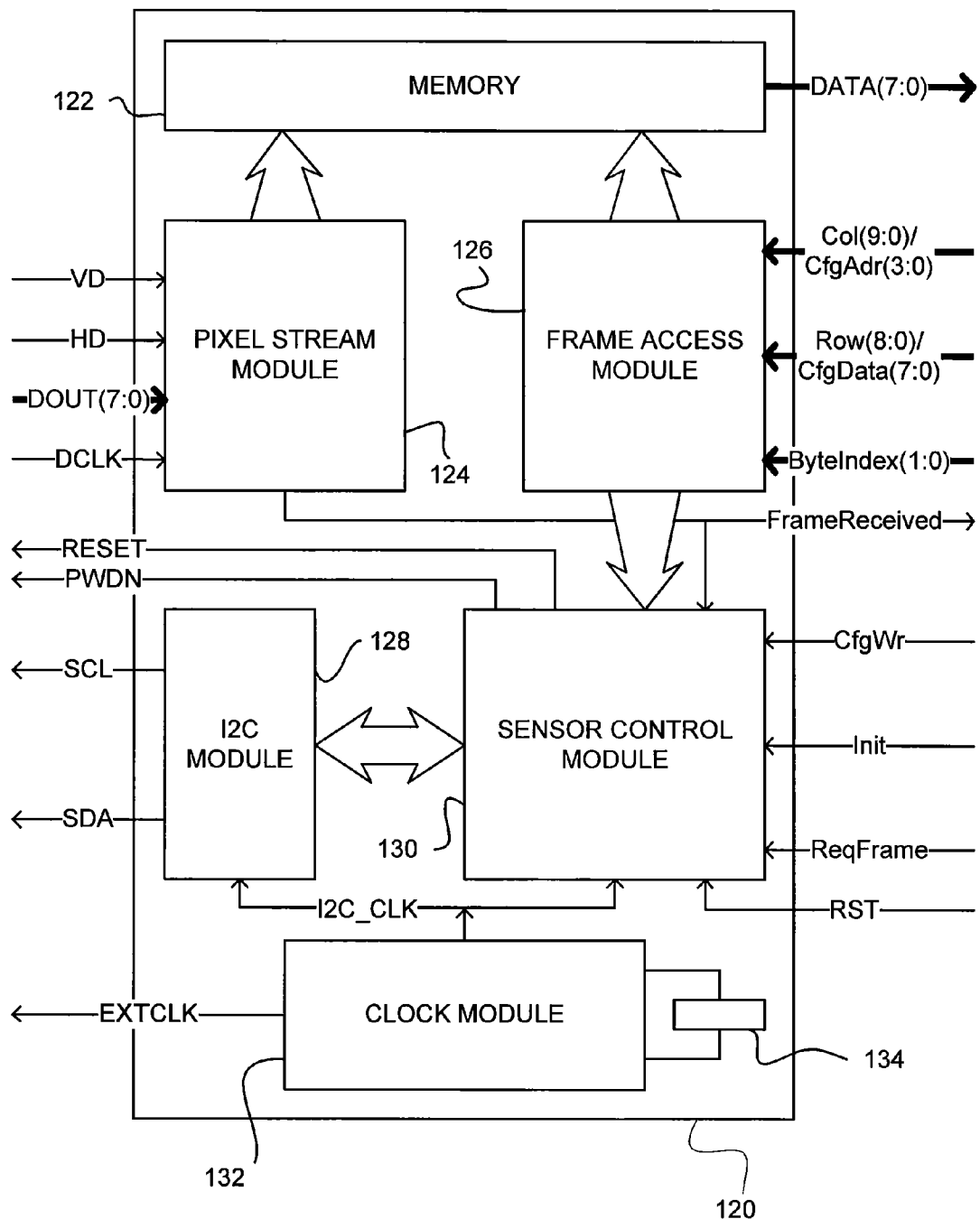
FIG. 4 illustrates an exemplary block diagram of the image sensor interface processor of FIG. 3.

Image sensor interface processor 120 is described in further detail herein, with particular reference to FIG. 4.

Image sensor 110 is communicatively coupled to image sensor interface processor 120. Accordingly, image sensor interface processor 120 (ISIP 120) is configured to control the operation of image sensor 110, including the issuance of wake, initialize, reset, sleep, capture image and other commands via I2C and other data communication interfaces. Similarly, image sensor interface processor 120 is configured to directly receive and process image data from image sensor 110 in real-time, as such image data is sensed and output by image sensor 110.

In turn, image sensor interface processor is communicatively coupled to microcontroller 180.

Image sensing system 300 allows a low performance microcontroller 180 to be interfaced with a high speed image sensor 110, without the need for a high speed microcontroller 199. Without ISIP 120, microcontroller 180 would not be capable of interfacing directly with high speed image sensor 110.

As compared to the approach of FIG. 1, image sensing system 300 can be provided with lower cost (as microcontroller 180 can be a simpler device) and can utilize chips offered in DIP packaging. Due to the relative simplicity of microcontroller 180, development time and complexity can be reduced. The available resources of microcontroller 180 can also be more readily exploited to their fullest, as opposed to a microprocessor, which may offer additional circuits that remain idle or unused. Power consumption can be considerably reduced, since microcontroller 180 can run at low speed at all times. Image sensor configuration can be simplified, as the microcontroller is relieved of the requirement to implement configuration and control logic (I2C). Similarly, power saving can be implemented automatically without intervention of microcontroller 180. Finally, virtually any image resolution can be supported, subject to the memory capacity of ISIP 120 (which can vary according to need). For example, image sensing system 300 can process SubQCIF, QQVGA, QVGA, VGA, Full HD, UHDV and the like.

Referring now to FIG. 4, there is shown an exemplary block diagram of image sensor interface processor 120. In general, the pins illustrated on the left hand side form an image sensor interface for connection with image sensor 110, while those on the right hand side form an image processor interface for connection to microcontroller 180 or some other processor. Pin labels corresponding to those of image sensor 110 are coupled together during operation of system 300. For example, the 'VD' output pin of image sensor 110 is connected to the 'VD' input pin of image sensor interface processor 120.

Image sensor interface processor 120 comprises a memory 122, a pixel stream module 124, a frame access module 126, a sensor control module 130, an I2C module 128 and a clock module 132. In some embodiments, I2C module 128 and sensor control module 130 may be a single module. Similarly, the functionality of various other modules may be merged or divided without affecting the operation of image sensor interface processor 120.

In some embodiments, clock module 132 may generate an internal (I2C_CLK) and external (EXTCLK) clock signal. In some other embodiments, an external crystal resonator 134, such as a parallel resonant crystal oscillator, may be used for generating the clock signals, and clock module 132 may simply multiply or divide the clock signal to generate the internal and external clock signals (e.g., using a mod-n counter). The internal clock signal may be used by the I2C module and the sensor control module. In at least some embodiments, the internal clock signal is an 800 kHz signal used for I2C communication. The external clock signal may be a multiple of the internal clock signal, and used to drive image sensor 110.

Figure 5:
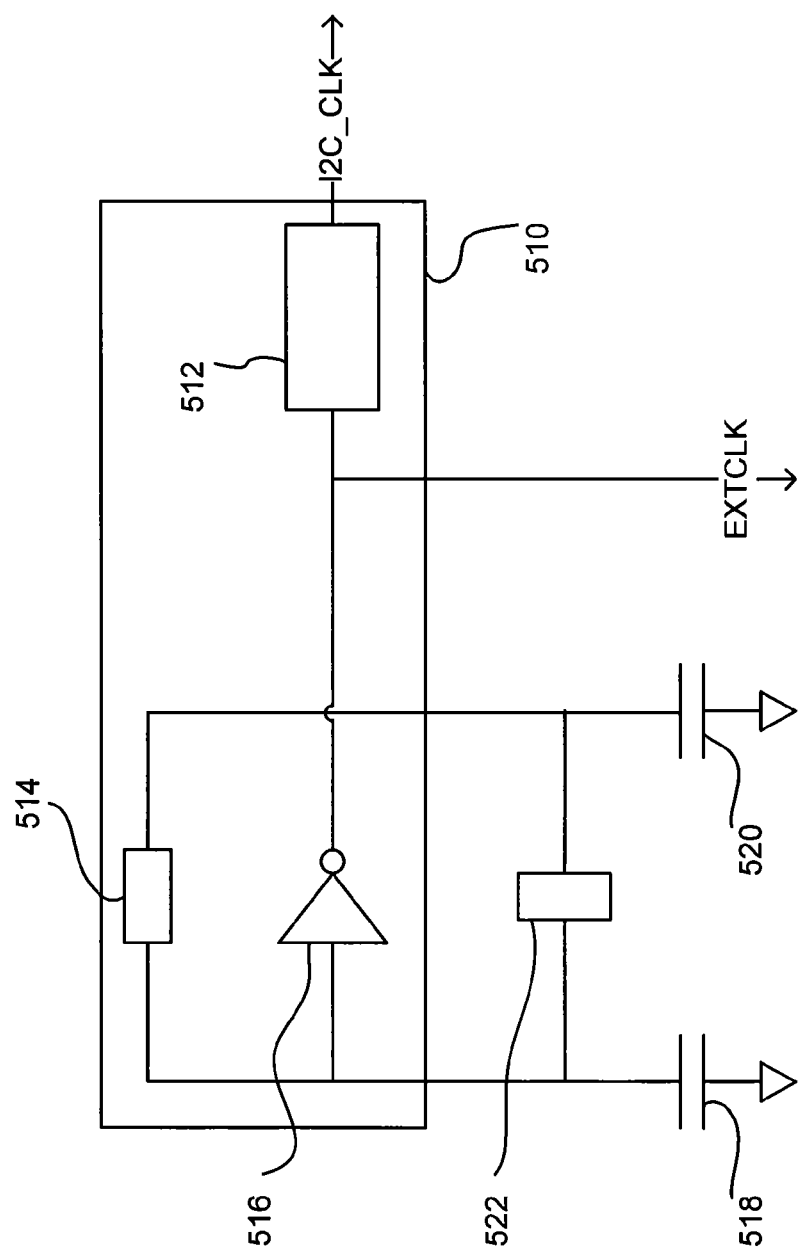
FIG. 5 illustrates an exemplary implementation of the clock module of FIG. 4.

Referring now to FIG. 5, there is shown an exemplary implementation of a clock module, such as clock module 132 of FIG. 4. Clock module 510 comprises a resistor 514 and inverter 516, which form part of a parallel resonant circuit connected to an external oscillator 522. In addition, clock module 510 comprises a mod-n counter 512, used to divide the clock signal to provide the internal clock signal I2C_CLK used by I2C module 128. The parallel resonant circuit further comprises two capacitors 518 and 520.

Many commercial image sensors require a high-speed external clock for their operation. By supplying the EXTCLK signal, clock module 132 can control the speed, and power consumption, of image sensor 110. For example, a full, high-speed clock rate can be provided during regular operation, and a reduced clock rate can be used during a sleep or inactive period.

Figure 6:
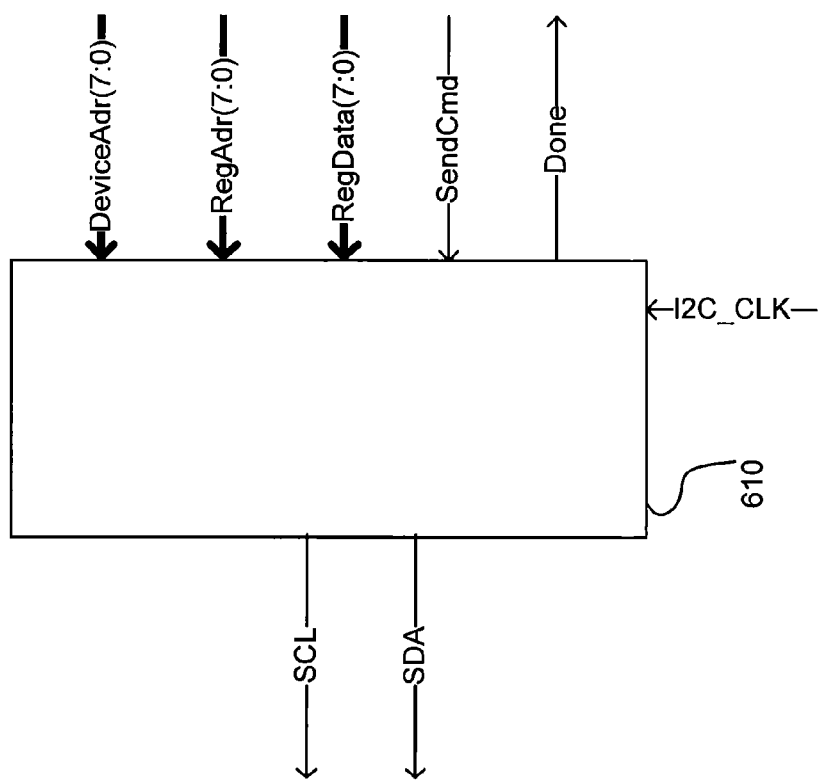
FIG. 6 illustrates an exemplary implementation of the I2C module of FIG. 4.

Referring now to FIG. 6, there is shown an exemplary I2C module, such as I2C module 128 of FIG. 4. I2C module 610 comprises SCL and SDA pins for communication using the I2C protocol. In addition, I2C module 610 comprises Device-Adr, RegAdr and RegData bus inputs, a SendCmd input and a Done output. I2C module 610 may be controlled by an I2C_CLK signal, input at the I2C_CLK input.

I2C module 610 can be used to generate the I2C protocol commands and data for transmission to image sensor 110. I2C commands and data may be transmitted serially using one line for data (SDA) and one for clock (SCL). In some embodiments, ISIP 120 may be configured in a single master mode, where ISIP 120 acts as a master device and image sensor 110 acts as the slave device. Accordingly, in such cases, only a subset of the I2C protocol needed, which can decrease the resources required when implementing ISIP 120.

To send an I2C command, I2C module 610 can take the device address (on the DeviceAdr bus), register address (on the RegAdr bus), and register data (on the RegData bus) as inputs from the sensor control module 130, and generate corresponding output bit data at the SCL and SDA output pins. I2C module 610 may also receive a "send command" signal on the SendCmd input. After the command and data is sent, I2C module 610 can signal to sensor control module 130 that the command was successfully sent on the 'Done' output. In some cases, the I2C command frame generation can be implemented using a finite state machine.

Accordingly, I2C module 610 can be configured to receive a configuration mapping from sensor control module 130 comprising device addresses, register addresses, and register data specific to particular image sensors. The configuration mapping can be provided as input from a sensor control module, such as sensor control module 130, and used by I2C module 610 to generate the appropriate I2C protocol commands at the SCL and SDA output pins of image sensor interface processor 120.

In general, the configuration mapping may vary for different image sensors 110 (e.g., image sensors provided by different manufacturers may use different register addresses and data for commands), however ISIP 120 can be configured with the suitable configuration mapping associated with particular image sensors.

One or more configuration mappings may be stored in internal registers of a frame access module, such as frame access module 126. Frame access module 126 may receive the configuration mappings using an input bus that is also used to specify memory addresses. For example, referring again to FIG. 4, a subset of Col(9:0) and Row(8:0) may be multiplexed as CfgAdr(3:0) and CfgData(7:0), respectively, where CfgAdr specifies an internal register address of ISIP 120 and CfgData specifies data to be placed in the internal register. Accordingly, by preconfiguring the configuration mapping, ISIP 120 can be adapted for use with many image sensors 110 whose configuration commands are known. Such configuration commands can typically be found with reference to a data sheet for the particular image sensor.

Image sensors of different manufacturers have different device IDs (or slave address), which is used for communication using the I2C protocol. Image sensors typically also have control registers used to configure their functionality, such as frame size, color depth, sleep mode, and so forth. These registers can be controlled and manipulated (e.g., read from and written to) via the I2C protocol. As the register addresses and command data can be different for different manufacturers, ISIP 120 can be configured with an appropriate configuration mapping, where the configuration mapping identifies for a particular image sensor the register addresses and command data to be written into the registers of the image sensor for a particular configuration.

Table 2 illustrates a sample configuration mapping for an exemplary image sensor. The table may be extended to accommodate additional special features for particular image sensors. The content of these registers can be modified using the multiplexed input data buses: CfgAdr(3:0) and CfgData(7:0). In order to write to a register of ISIP 120, the appropriate register address can be placed on the CfgAdr(3:0) bus. The corresponding data (e.g., command or image sensor register address) can be placed on the CfgData(7:0) bus, and the CfgWr pin can be asserted high.

In Table 2, the "CfgAdr" column displays an exemplary register address of ISIP 120 in the configuration mapping, whereas the "CfgData" column displays a description of the data referenced at the internal register address. For example, internal register address 0010 contains the address of the sleep register for an image sensor. Correspondingly, internal register address 0011 contains the command data corresponding to a sleep command for the image sensor.

TABLE 2

| CfgAdr(3:0) | CfgData(7:0) |
| --- | --- |
| 0000 | Device ID |
| 0001 | Total Cmd. |
| 0010 | Sleep Reg. Adr. |
| 0011 | Sleep Reg. Data |
| 0100 | Wake Reg. Adr. |
| 0101 | Wake Reg. Data |
| 0110 | Cmd1 Reg. Adr. |
| 0111 | Cmd1 Reg. Data |
| 1000 | Cmd2 Reg. Adr. |
| 1001 | Cmd2 Reg. Data |
| 1010 | Cmd3 Reg. Adr. |
| 1011 | Cmd3 Reg. Data |
| 1100 | Cmd4 Reg. Adr. |
| 1101 | Cmd4 Reg. Data |
| 1110 | ImageWidth/4 |
| 1111 | Bytes-per-pixel |

Once a configuration mapping is received by ISIP 120, it can remain preconfigured and need not be retransmitted with subsequent commands, unless image sensor 110 is replaced with an image sensor of a different type.

Referring again to FIG. 4, memory 122 may be a volatile, random access memory, although other suitable types of memory may also be used. Memory 122 is sized to store one or more complete image frames of different resolutions, such as CIF, QVGA, VGA, full HD, and UHDV. Accordingly, microcontroller 180, which may have limited on-board memory, can access image pixels from memory 122 at its desired processing rate. Moreover, because memory 122 is capable of storing a complete image frame, microcontroller 180 can access specific image segments of the same frame without having to reconfigure the image sensor. For example, when computing Discrete Cosine Transform-based image coding, several 8×8 blocks of image segments of the same frame can be obtained as needed.

In at least some cases, memory 122 may be a single port random access memory. The size of memory 122 can be chosen depending upon specific application requirements. In some embodiments, memory 122 may comprise a multiplexer for the address bus and two tri-state buffers for the data bus, used to facilitate writing and reading from memory 122. In some other cases, memory 122 may be a dual-port memory supporting concurrently read and write operations. However, read and write operations need not take place concurrently. Other designs will become apparent to those skilled in the art.

Pixel stream module 124 is configured to receive image data from image sensor 110 and store the image data in memory 122. In general, the input pins of pixel stream module 124 correspond to the similarly named output pins of image sensor 110. In particular, pixel stream module 124 can receive input on the DOUT input data bus. In addition, pixel stream module 124 can monitor signals on the HD and VD pins, to determine when 'end of row' and 'end of frame' is signaled. Likewise, pixel stream module 124 can monitor an output data rate signal from image sensor 120 on the DCLK pin.

Pixel stream module 124 can operate at very high speed (e.g., over 200 MHz), so that image data received via the DOUT bus from image sensor 110 can be received and stored in real-time. Image data may be stored in memory 122 as it arrives (e.g., pixel-by-pixel). Once the complete image frame is received, an output signal may be transmitted on the 'FrameReceived' output, to signal to microcontroller 180 that a complete frame is available for random access.

The 'FrameReceived' signal may also be provided to sensor control module 130, where it can be used, for example, to initiate a sleep state of image sensor 110.

In some embodiments, image frame data may be stored sequentially, row by row, in memory 122. When storing image frame data in memory 122, pixel stream module can generate memory addresses sequentially for each pixel, for example using an up-counter. In some cases, the addresses may be generated using a counter. In other cases, the addresses may be based on a row and column value in the image frame. Various write and address schemes may be possible with suitable modification of the pixel stream and frame access modules. For example, the starting address in memory 122 for each row of an image may be fixed, regardless of the column width.

Figure 7:
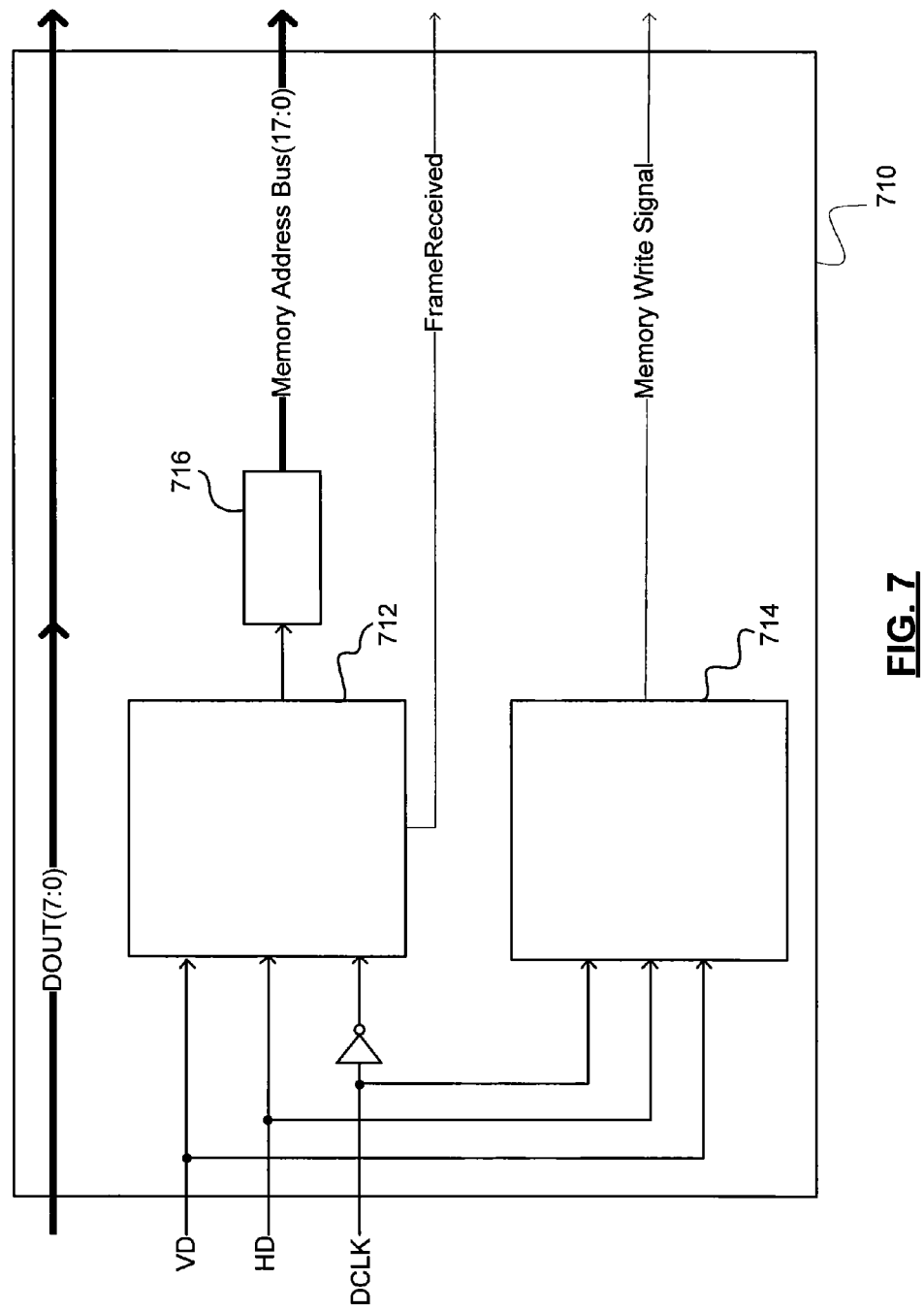
FIG. 7 illustrates an exemplary implementation of the pixel stream module of FIG. 4.

Referring now to FIG. 7, there is shown an exemplary implementation of a pixel stream module, such as pixel stream module 124 of FIG. 4. Pixel stream module 710 comprises a validation module 712, a write module 714 and a counter 716.

Pixel stream module 710 can be configured to receive data from image sensor 110 on the DOUT bus, and to generate the address and control signals for a memory (e.g., memory 122) of ISIP 120.

Image data input on the DOUT bus may be directly or indirectly coupled to a data input bus of memory 122.

Both validation module 712 and write module 714 may receive 'end of row' and 'end of frame' signals from the HD and VD pins, respectively, along with the output data rate signal from the DCLK pin. The output data rate signal supplied to validation module 714 may be inverted, such that, in the valid data state, at each negative edge event of DCLK, the address up-counter 716 is incremented based on a signal from validation module 714. Conversely, at each positive edge event of DCLK, a write signal may be generated by write module 714.

The output of address up-counter 716 can be used to generate addresses for memory 122.

After a complete frame is received, the address up-counter 716 can be cleared and a FrameReceived signal transmitted by validation module 714.

Referring once again to FIG. 4, sensor control module 130 may be used to configure and control various modes of the image sensor 110. For example, sensor control module 130 can generate commands to configure frame size and color depth. Similarly, sensor control module 130 can generate commands to set the image sensor 110 to a wake mode or a sleep mode.

In one example, after an initialization signal (Init) is received, sensor control module 130 can generate a RESET signal for the image sensor 110. Sensor control module 130 may subsequently wait for a predetermined period (e.g., 2000 cycles of the EXTCLK signal), before issuing further 120 commands to image sensor 110. After the wait period, commands can be generated and sent to the image sensor using the I2C module 128, to configure capture parameters (e.g., frame size, color depth).

The commands can be generated based on a configuration mapping, such as the configuration mapping of Table 2.

A WAKE command can be sent, after which image sensor 110 captures and transmits image data. Subsequently, for example once a complete frame is received and stored in memory 122, sensor control module can send a SLEEP command to image sensor 110, to reduce power consumption.

Sensor control module 130 can then wait until a Request Frame signal is received, for example on the ReqFrame pin, before repeating the process to capture another frame.

Figure 8:
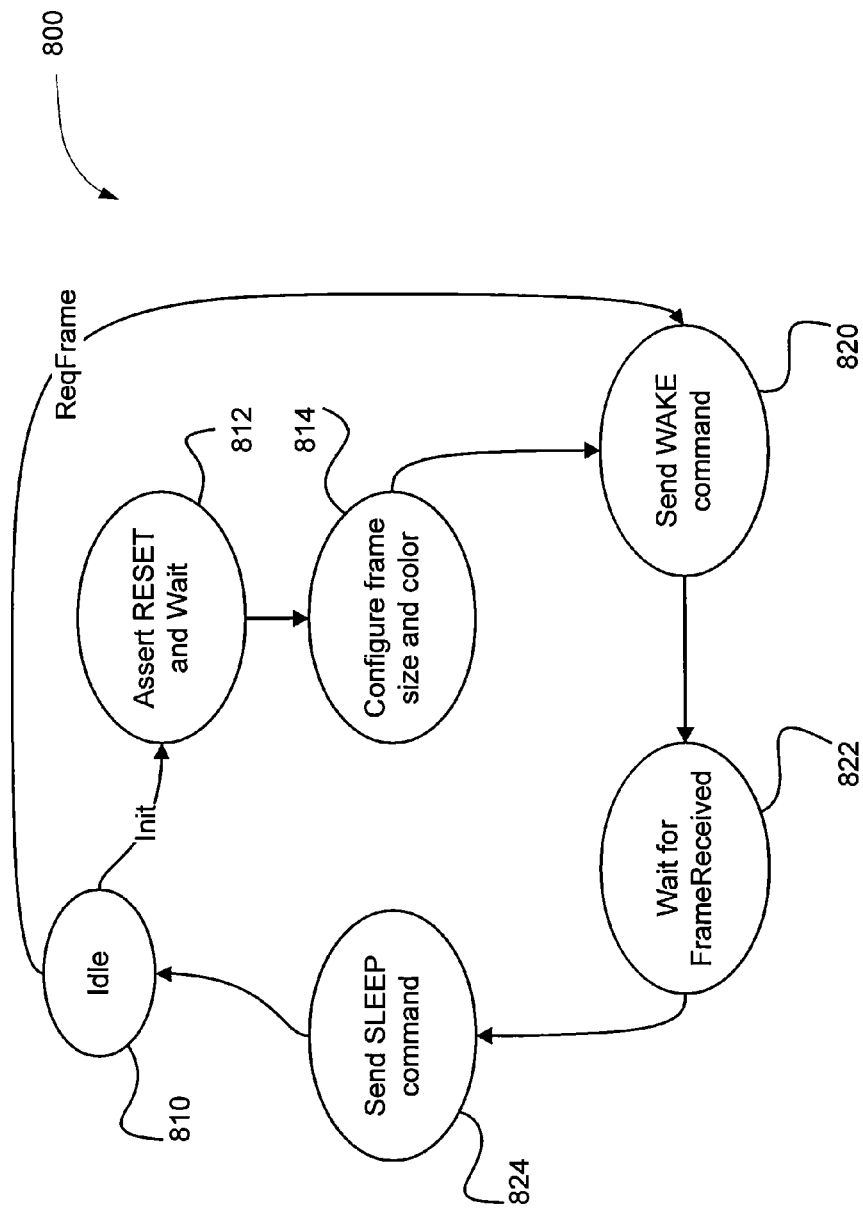
FIG. 8 illustrates an exemplary finite state machine diagram for the sensor control module of FIG. 4.

Referring now to FIG. 8, there is illustrated an exemplary finite state machine diagram for a sensor control module, such as sensor control module 130.

Sensor control process 800 begins in the idle state at 810. Upon receiving an Init signal, if the image sensor has not been initialized, the sensor control module may transmit a RESET command wait for a predetermined period at 812. Subsequently, the sensor control module may issue configuration commands (e.g., based on the configuration mapping) at 814. Once the image sensor is configured, the sensor control module may issue a WAKE command at 820.

Alternately, if the image sensor has been initialized previously, the sensor control module may respond to a Request Frame signal by sending a WAKE command to the image sensor at 820, omitting the configuration.

Once the WAKE command is transmitted, the sensor control block may wait for a complete image frame to be received at 822.

Once the complete image frame is received, the sensor control block may issue a SLEEP command to the image sensor, at 824.

Referring once again to FIG. 4, frame access module 126 generally receives requests for image data at a specified memory address, retrieves the requested data from memory 122, and transmits the requested data. In particular, frame access module 126 can receive requests for individual pixels of image data, which may be randomly accessed from image data for a complete image frame.

Accordingly, frame access module 126 is configured to communicate with memory 122. Frame access module 126 is further provided with an input data bus, for receiving data addresses. Optionally, frame access module 126 may transmit image data on an output data bus, however data may also be output to microcontroller 180 by memory 122. In some embodiments, frame access module 126 may have separate data and address buses. However, in other embodiments, the data and address buses may be multiplexed. In still other embodiments, the address bus may be still further multiplexed. For example, rather than provide separate row and column lines, the row and column lines may be multiplexed. This enables microcontroller 180 to utilize less input-output pins, the availability and placement of which can be a design constraint.

Figure 9:
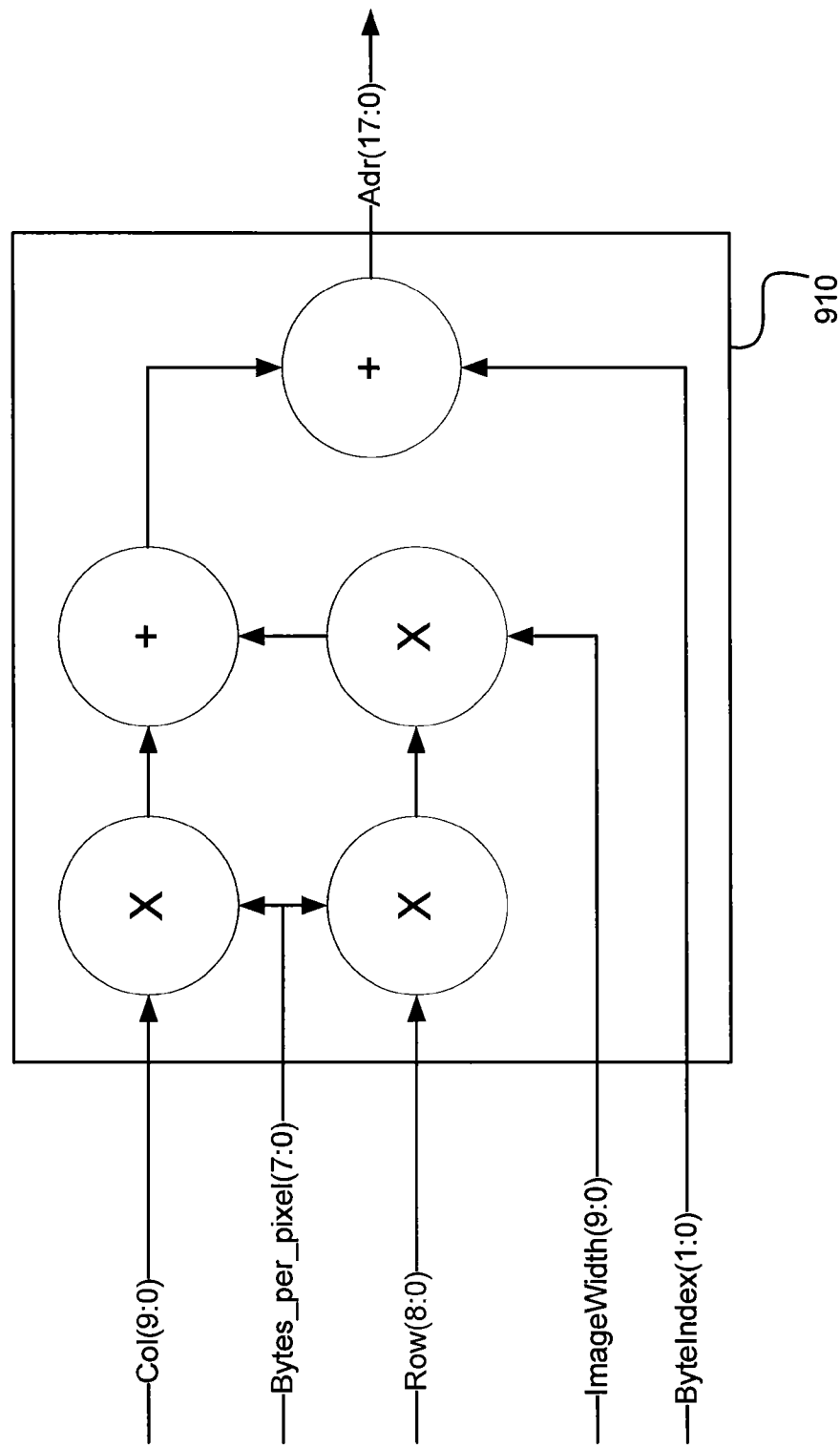
FIG. 9 illustrates an exemplary implementation of the frame access module of FIG. 4.

Referring now to FIG. 9, there is illustrated an exemplary implementation of a frame access module, such as frame access module 126.

Frame access module 910 takes input on the Col(9:0), Row(8:0) and ByteIndex(1:0) buses, and generates a physical memory address from the column and row position. For example, to access a pixel value at column C (where $0 \leq C \leq W-1$) and at row R (where $0 \leq R \leq H-1$), and where W is the image width and H is the image height, the physical memory address can be calculated using the following equation:

Address=(Bytes_per_pixel×C)+(Bytes_per_pixel×W× R)+ByteIndex

Bytes_per_pixel can be taken from the configuration mapping, for example as shown in Table 2. If the Bytes_per_pixel is greater than one, then consecutive bytes can be accessed by specifying an offset on the ByteIndex bus.

In operation, ISIP 120 can be configured to receive two general types of signals from microcontroller 180: configuration signals (e.g., CfgWr, Init, ReqFrame, and RST) and frame access signals (e.g., DATA, Col, Row, etc.).

Configuration signals can be asynchronous in nature. Similarly, frame access signals may depend on the speed of microcontroller 180 and thus need not be synchronized with the internal clock of ISIP 120.

To begin capturing a frame, microcontroller 180 can transmit a signal on the RST pin. A desired frame size and color depth can be signaled, for example on the 'CfgWr' input of ISIP 120. Subsequently, the image capturing process can be initiated, for example by transmitting a signal on the 'Init' input of ISIP 120.

During the capturing process, the DATA(7:0) bus of ISIP 120 may be kept in a high impedance mode. Once the complete image frame is received, a Frame Received signal may be transmitted on the FrameReceived output of ISIP 120. At this time, the image sensor may be put into a sleep mode to conserve power. Subsequently, microcontroller 180 may access any one or more pixels from memory 122 at the desired speed, and in a random access fashion.

For example, after a memory address is requested by microcontroller 180 by placing the column and row value on the Col(9:0) and Row(8:0) bus of ISIP 120, the requested data (e.g., pixel value) is placed on the DATA(7:0) bus of ISIP 120, after a delay associated with the memory access time (e.g., 35 ns).

For image data with more than one byte per pixel (e.g., an RGB888, RGB565 or YUV422 image), consecutive bytes may need to be read for one pixel. Accordingly, the ByteIndex bus may be used to identify the consecutive bytes.

Once the desired pixel values are read by microcontroller 180, the process of capturing the next frame with the same configuration can be repeated by transmitting a Request Frame signal to the ReqFrame input of ISIP 120.

The time to capture a complete image frame, $T_{Req-Receive}$, can be computed as follows:

$$T_{wake} = \text{I2C\_WriteCommandBits} \times 1/f_{SCL}$$

$$= 30 \times 1/(400 \text{ kHz})$$

$$= 75 \text{ μs}$$

$$T_{framestore} = (\text{InitBlankBytes} + (\text{PixelBytes/Row} + \text{BlankBytes/Row}) \times \text{TotalRow}) \times n/f_{DCLK}$$

$$T_{Req-Receive} = T_{wake} + T_{framestore}$$

where $T_{wake}$ is the time required for the image sensor to wake from a sleep mode, $T_{framestore}$ is the time required to store a complete frame in memory 122. I2C_WriteCommandBits is the number of bits to be sent when writing configuration parameters to the internal registers of the image sensor. $f_{SCL}$ is the frequency of the SCL pin in the I2C interface. InitBlankBytes is the number of blank bytes sent by the image sensor at the beginning of a new frame. PixelBytes/Row is the number of pixel bytes sent by the image sensor for one row. BlankBytes/Row is the number of blank bytes sent by the image sensor for one row. TotalRow is the number of rows sent by the image sensor for a complete image frame. 'n' is a constant divider for the DCLK.

A processing rate, in frames per second, that can be achieved by microcontroller 180 can be computed as follows:

$$T_{processing} = T_{mem\_access} + T_{algorithm}$$

$$T_{mem\_access} = N \times \text{BPP} \times \text{CPI} \times 1/f_{mcu}$$

$$\text{FPS} = 1/(T_{Req-Receive} + T_{Processing})$$

where $T_{mem\_access}$ is memory the time required to access the required pixel bytes from memo 122, $T_{algorithm}$ is the time spent by microcontroller 180 performing image processing or other manipulation of the image data, N is the number of random pixels that are accessed by microcontroller 180 (e.g., in the worst case, a maximum N=W×H, where W and H are image width and height, respectively), BPP is the number of bytes per pixel, CPI is the number of clock cycles taken by microcontroller 180 to read a byte from memory 122, and $f_{mcu}$ is the clock frequency of microcontroller 180.

Table 3 illustrates an exemplary table of the above parameters for a sample image sensor (e.g., Toshiba TCM8230MD). It will be appreciated that similar tables can be populated for other image sensors from the respective datasheets of those image sensors.

TABLE 3

| Image size | Init BlankBytes | PixelBytes/ Row (RGB) | BlankBytes/ Row | TotalRow | n |
|---|---|---|---|---|---|
| SubQCIF | 157 | 256 | 1304 | 254 | 2 |
| QQVGA | 157 | 320 | 1240 | 254 | 2 |
| QVGA | 157 | 640 | 920 | 254 | 2 |
| VGA | 157 | 1280 | 280 | 507 | 1 |

Figure 10:
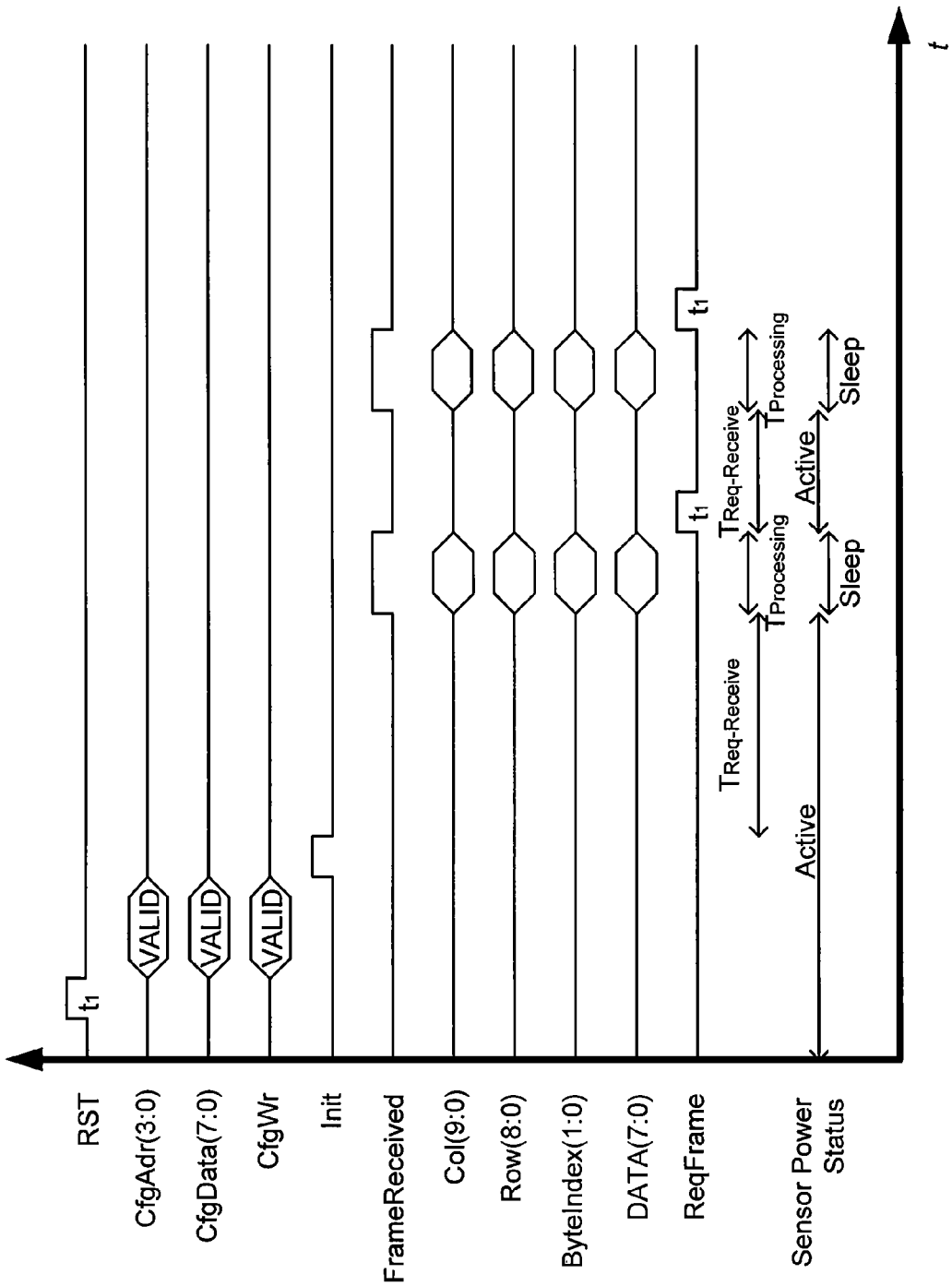
FIG. 10 illustrates an exemplary timing diagram for the image sensor interface processor of FIG. 4.

Referring now to FIG. 10, there is illustrated an exemplary timing diagram for ISIP 120. In timing diagram 1000, $t_1$ may be between 1.25 microseconds and 2.5 microseconds. That is, $t_1$ may be based on the period of the I2C_CLK signal.

Figure 11:
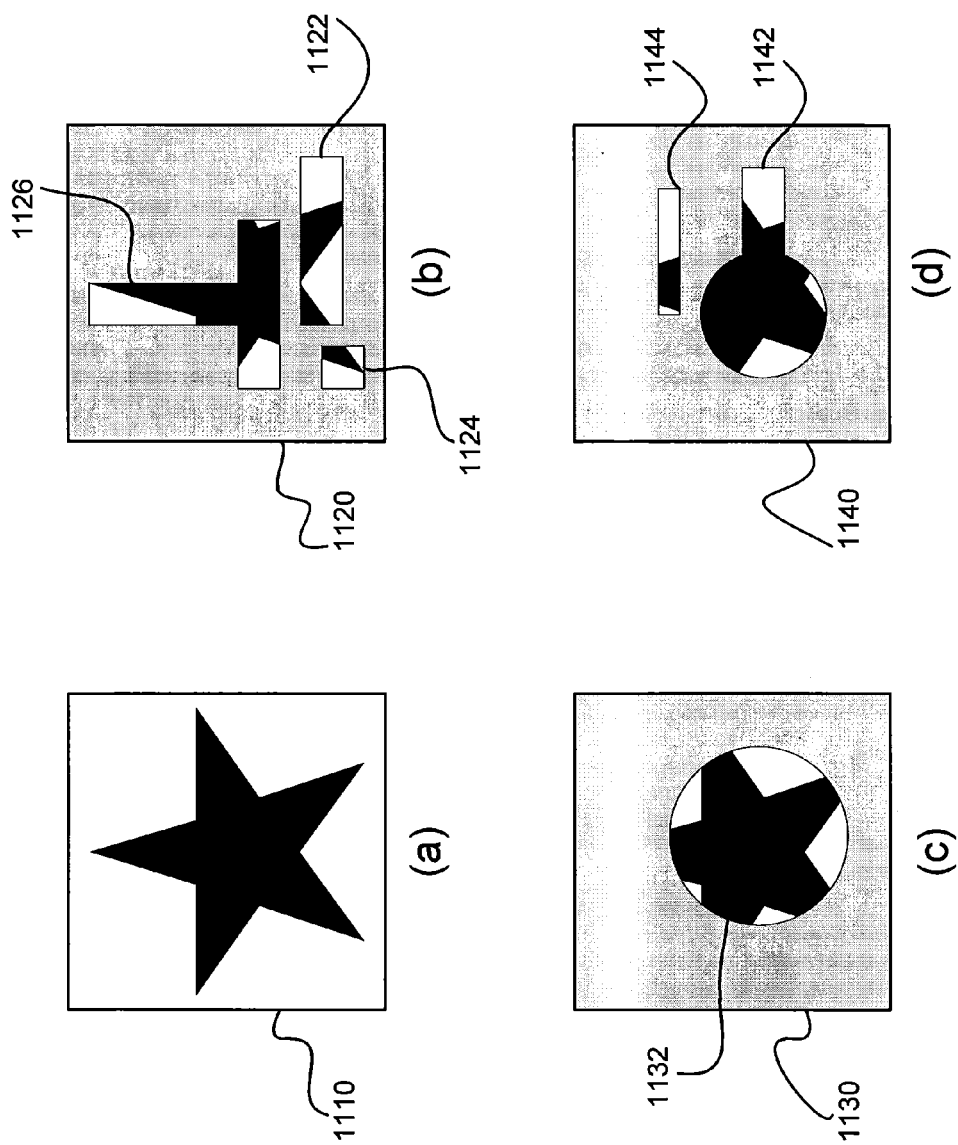
FIGS. 11(a) to 11(d) illustrate exemplary random access memory patterns.

Referring now to FIG. 11, there are illustrated four examples of the random access memory read patterns possible when using ISIP 120.

FIG. 11(a) illustrates a complete image frame 1110. That is, in FIG. 11(a), microcontroller 180 has requested all of the pixel values for the complete image frame.

FIG. 11(b) illustrates a partial image frame, in which microcontroller 180 has requested only data corresponding to several regions of interest 1122, 1124 and 1126. Unrequested regions are shown as shaded. The regions of interest may be determined programmatically by microcontroller 180, allowing virtually any shape to be formed and accessed. For example, region of interest 1122 is a simple rectangle. However, region 1126 may be defined as a multi-sided polygon, or as a union of two rectangles.

Other shapes for the regions of interest are also possible. For example, FIG. 11(c) illustrates an image frame 1130 with a circular region of interest 1132, in which microcontroller 180 has only retrieved pixel values that fall within region 1132.

Finally, multiple regions of interest, in different shapes, can be specified. For example, FIG. 11(d) illustrates an image frame 1140 in which disparate regions of interest 1142 and 1144 have been specified.

Image data may also be accessed using other base shapes, such as ellipses, polygons, etc. Accordingly, because pixels can be individually accessed in random fashion, any subset of the image can be requested, which can be useful in embedded system applications such as pattern recognition, robotic vision, bio-medical imaging, and other image processing and tracking systems.

Figure 12:
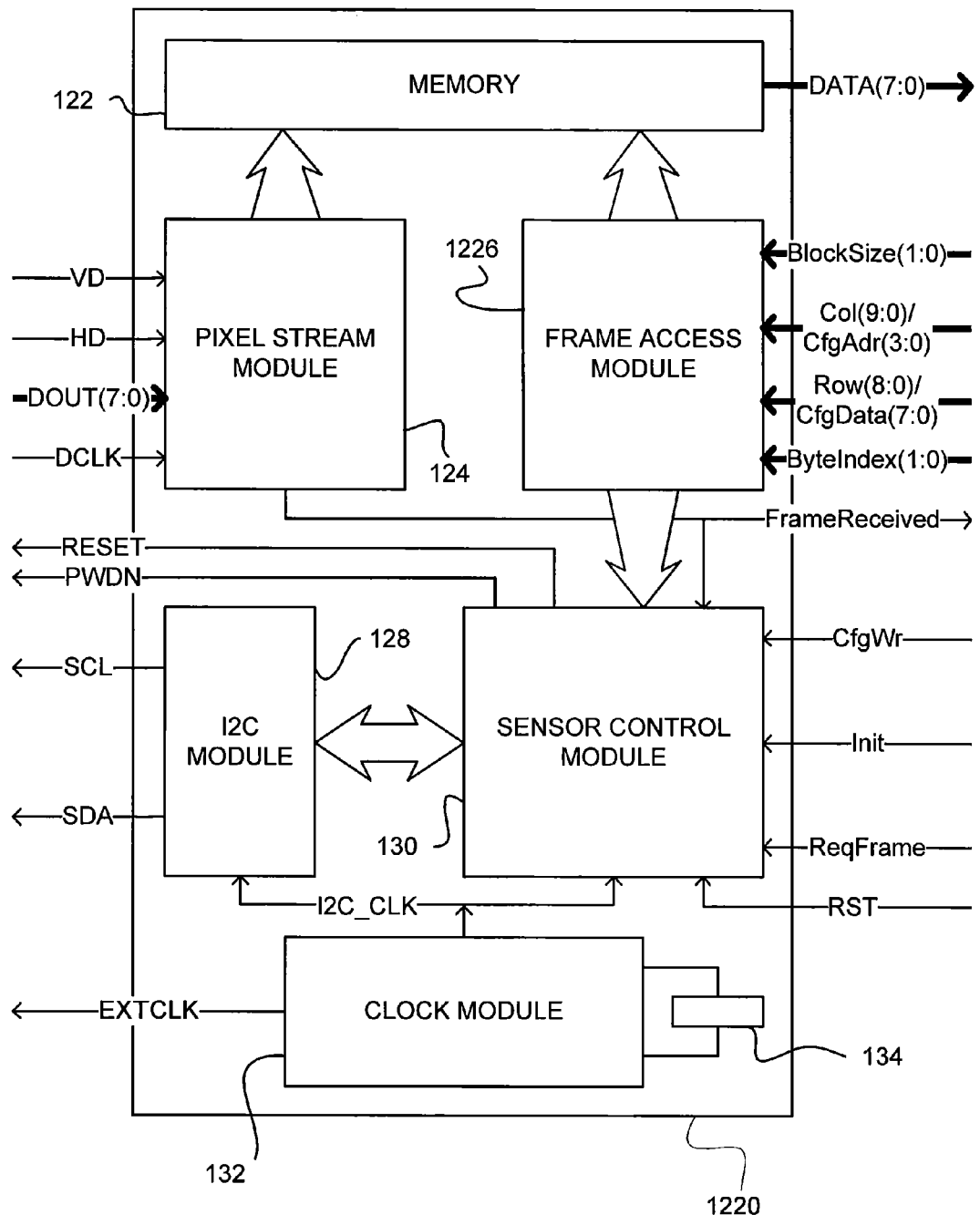
FIG. 12 illustrates an exemplary block diagram of an alternative image sensor interface processor.

Referring now to FIG. 12, there is shown an exemplary block diagram of an alternative image sensor interface processor 1220. In general, image sensor interface processor 1220 is generally analogous to image sensor interface processor 120. Accordingly, image sensor interface processor 1220 comprises a memory 122, a pixel stream module 124, a sensor control module 130, an I2C module 128 and a clock module 132. ISIP 1220 also comprises a frame access module 1226 that is generally analogous to frame access module 126, with some variations. In particular, frame access module 1126 may be configured for random, block-based memory access, as opposed to random, single-pixel access. Such block-based memory access may be used, for example, in conjunction with block-based transform algorithms, such as the DCT.

Frame access module 1226 generally receives requests for data in a specified range of memory addresses. The location and geometry of the specified range may be received in a variety of ways. In the illustrated example, frame access module 1226 receives a memory address corresponding to an "upper-left" corner of a block, along with a block size. Upon receiving the block request, frame access module 1226 retrieves the requested block data from memory 122, beginning at the specified memory address and continuing in the horizontal and vertical directions until all pixels contained in a block of the requested size are transmitted.

In the illustrated example of FIG. 12, frame access module 1226 is configured to receive data addresses (Col, Row), a byte index (ByteIndex) and a block size (BlockSize) as inputs. Upon receiving these inputs, frame access module 1226 causes each pixel in the requested block to be retrieved and transmitted from memory 122.

In another example, frame access module 1226 has fixed or pre-configurable block sizes. For example, the block size may be fixed at 4×4 or 8×8. Alternatively, the block size may be pre-configured in an internal control register of ISIP 1220. Each block may be assigned an identifier and subsequently requested using the respective block identifier, which may reduce the number of address lines and pins required.

The described embodiments may be implemented in a field programmable gate array (FPGA) device or directly in an application specific integrated circuit (ASIC).

When implemented in an FPGA, most modules of ISIP 120 or 1220 can be synthesized using the FPGA resources. Other modules, such as memory 122 and clock module 132 can utilize specialized circuits (e.g., SRAM, clock generator) of the FPGA device.

An exemplary embodiment of ISIP 120 has been synthesized and implemented as an ASIC using a 0.18 um CMOS process. The resulting chip layout (without memory block) occupies less than 2 mm$^2$ and consumes approximately 13.8 mW of power when running at 10 MHz with a 3.0 V supply.

Accordingly, the ASIC has a data rate of approximately 254 megasamples/sec. Using the equations described herein, it can be seen that this data rate translates to frame rates of approximately 333 fps for VGA (640×480) frames and 56 fps for full HD (1920×1080) resolution frames. This data rate is considerably higher than other image sensors for same frame resolution.

The described embodiments provide a bridge between commercially available image sensors and low cost, low power microcontrollers. The described image sensor interface processor can be configured to work with virtually any DVP-based image sensor, in addition to sensors with other interface types. Using the ISIP, a slow and low-power microcontroller (or other general purpose or image processor) with little memory capacity can communicate with high-speed image sensors to capture images of large size. The pixel data can also be accessed in a random access fashion through a parallel memory access interface at any speed desired by the microcontroller. Moreover, automatic power management of the image sensor can be provided. In some alternative embodiments, the described image sensor interface processor may be integrated into the image sensor itself, or a microcontroller, or some other intermediate device.

The resulting system can be used in a variety of application environments, such as robotic vision, imaging, video, and the like.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments.

Further, while the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

We claim:

1. An interface processor for providing random access to an image frame from an image sensor, the processor comprising:
   a memory;
   a sensor control module configured to transmit a wake signal to the image sensor, wherein the sensor control module is further configured to store a configuration mapping associated with the image sensor, and wherein the configuration mapping comprises one or more register addresses and one or more register entries for controlling the image sensor, wherein the sensor control module is further configured to receive the configuration mapping prior to transmitting the wake signal;

a pixel stream module configured to receive a data signal at an output data rate from the image sensor following transmission of the wake signal and store the data signal in the memory, wherein the data signal comprises a plurality of pixels that correspond to the image frame; and a frame access module configured to receive an address signal, determine a selected pixel of the plurality of pixels referenced by the address signal, retrieve the selected pixel from the memory, and transmit an image signal comprising the selected pixel.

2. The processor of claim 1, wherein the data signal is received from the image sensor in real-time.

3. The processor of claim 2, wherein the data signal is received using a DVP interface.

4. The processor of claim 1, wherein the sensor control module is further configured to transmit a configuration command to the image sensor.

5. The processor of claim 4, wherein the configuration command comprises a frame size or color depth.

6. The processor of claim 4, wherein the configuration command is a sleep command, and wherein the sleep command is transmitted following receipt of the plurality of pixels that correspond to the image frame.

7. The processor of claim 4, wherein the configuration command uses the I2C protocol.

8. The processor of claim 1, wherein the plurality of pixels are transmitted serially in the data signal.

9. The processor of claim 1, wherein the plurality of pixels are transmitted serially on a row-by-row basis in the data signal.

10. The processor of claim 1, wherein the selected pixel is individually addressable in the plurality of pixels.

11. The processor of claim 1, wherein the selected pixel is determined based on a row and a column of the image frame provided in the address signal.

12. The processor of claim 11, further comprising an address generation module configured to generate a read address for the selected pixel based on the row and the column provided in the address signal.

13. The processor of claim 1, wherein the image signal is transmitted to a microcontroller.

14. The processor of claim 13, wherein an input data rate of the microcontroller is lower than the output data rate of the data signal.

15. A method for providing random access to an image frame from an image sensor, the method comprising:
receiving a configuration mapping associated with the image sensor, wherein the configuration mapping comprises one or more register addresses and one or more register entries for controlling the image sensor;
storing the configuration mapping;
transmitting a wake signal to the image sensor from an interface processor after receiving the configuration mapping;
receiving a data signal at an output data rate from the image sensor following transmission of the wake signal;
storing the data signal in a memory, wherein the data signal comprises a plurality of pixels that correspond to the image frame;
receiving an address signal;
determining a selected pixel of the plurality of pixels referenced by the address signal;
retrieve the selected pixel from the memory; and
transmitting an image signal comprising the selected pixel.

16. An image sensing system, the system comprising:
an image sensor;
a processor; and
an interface processor for providing random access to an image frame from the image sensor, the interface processor comprising:
a memory;
a sensor control module configured to transmit a wake signal to the image sensor, wherein the sensor control module is further configured to store a configuration mapping associated with the image sensor, and wherein the configuration mapping comprises one or more register addresses and one or more register entries for controlling the image sensor, wherein the sensor control module is further configured to receive the configuration mapping prior to transmitting the wake signal;
a pixel stream module configured to receive a data signal at an output data rate from the image sensor following transmission of the wake signal and store the data signal in the memory, wherein the data signal comprises a plurality of pixels that correspond to the image frame; and
a frame access module configured to receive an address signal, determine a selected pixel of the plurality of pixels referenced by the address signal, retrieve the selected pixel from the memory, and transmit an image signal comprising the selected pixel.

17. An interface processor for providing random access to an image frame from an image sensor, the processor comprising:
a memory;
a sensor control module configured to transmit a wake signal to the image sensor;
a pixel stream module configured to receive a data signal at an output data rate from the image sensor following transmission of the wake signal and store the data signal in the memory, wherein the data signal comprises a plurality of pixels that correspond to the image frame; and
a frame access module configured to receive an address signal and a block size signal, determine a block of pixels in the plurality of pixels referenced by the address signal and the block size signal, retrieve the block of pixels from the memory, and transmit an image signal comprising the block of pixels.

18. A method for providing random access to an image frame from an image sensor, the method comprising:
transmitting a wake signal to the image sensor from an interface processor;
receiving a data signal at an output data rate from the image sensor following transmission of the wake signal;
storing the data signal in a memory, wherein the data signal comprises a plurality of pixels that correspond to the image frame;
receiving an address signal;
receiving a block size signal;
determining a block of pixels in the plurality of pixels referenced by the address signal and the block size signal;
retrieving the block of pixels from the memory; and
transmitting an image signal comprising the block of pixels.

19. An image sensing system, the system comprising:
an image sensor;
a processor; and
an interface processor for providing random access to an image frame from the image sensor, the interface processor comprising:
a memory;
a sensor control module configured to transmit a wake signal to the image sensor;
a pixel stream module configured to receive a data signal at an output data rate from the image sensor following transmission of the wake signal and store the data signal in the memory, wherein the data signal comprises a plurality of pixels that correspond to the image frame; and
a frame access module configured to receive an address signal and a block size signal, determine a block of pixels in the plurality of pixels referenced by the address signal and the block size signal, retrieve the block of pixels from the memory, and transmit an image signal comprising the block of pixels.

* * * * *